US007917152B2

(12) United States Patent
Alarcon et al.

(10) Patent No.: US 7,917,152 B2
(45) Date of Patent: Mar. 29, 2011

(54) ENHANCED FAST HANDOVER PROCEDURES

(75) Inventors: Leopoldo Alarcon, Malaga (ES); Sandro Grech, Helsinki (FI)

(73) Assignee: Nokia Corporation, Espoo (FI)

(*) Notice: Subject to any disclaimer, the term of this patent is extended or adjusted under 35 U.S.C. 154(b) by 997 days.

(21) Appl. No.: 10/776,502

(22) Filed: Feb. 12, 2004

(65) Prior Publication Data

US 2004/0264476 A1   Dec. 30, 2004

(30) Foreign Application Priority Data

Jun. 27, 2003 (EP) .................................. 03014730

(51) Int. Cl.
*H04W 24/00* (2009.01)
(52) U.S. Cl. ................. 455/456.1; 370/395.1; 709/239
(58) Field of Classification Search .................. 370/328, 370/401, 331, 353; 455/432, 436, 438–444; 380/247; 340/5.8, 2.23; 709/132, 229
See application file for complete search history.

(56) References Cited

U.S. PATENT DOCUMENTS

| 6,018,657 | A  | * | 1/2000  | Kennedy et al. ............ 455/426.1 |
| 6,064,887 | A  | * | 5/2000  | Kallioniemi et al. ......... 455/445 |
| 6,651,105 | B1 | * | 11/2003 | Bhagwat et al. .............. 709/239 |
| 6,992,995 | B2 | * | 1/2006  | Agrawal et al. ............... 370/328 |
| 7,269,425 | B2 | * | 9/2007  | Valko et al. ................. 455/456.1 |
| 7,599,370 | B1 | * | 10/2009 | Leung et al. .................. 370/392 |
| 2003/0086425 | A1 | * | 5/2003  | Bearden et al. ............... 370/392 |
| 2003/0225892 | A1 | * | 12/2003 | Takusagawa et al. ......... 709/227 |
| 2006/0198372 | A1 | * | 9/2006  | Lee .............................. 370/389 |
| 2007/0127495 | A1 | * | 6/2007  | de Gregorio et al. .... 370/395.52 |

FOREIGN PATENT DOCUMENTS

| WO | WO 01/28185 | 4/2001 |
| WO | WO 03/092314 | 11/2003 |
| WO | WO 03/092315 | 11/2003 |

OTHER PUBLICATIONS

"3rd Generation Partnership Project; Technical Specification Group Services and System Aspects; 3G Security; Network Domain Security; IP network layer security (Release 5)", 3GPP TS 33.210 V5.3.0 (Mar. 2003).

(Continued)

*Primary Examiner* — Nghi H Ly
*Assistant Examiner* — Amancio Gonzalez
(74) *Attorney, Agent, or Firm* — Mintz, Levin, Cohn, Ferris, Glovsky & Popeo, P.C.

(57) ABSTRACT

A method for performing a change of a connection of a mobile entity from a first network access entity to a second network access entity, wherein a global address of the first network access entity is not known to the mobile entity is provided. According to one embodiment, the method includes the step of sending a message including information for identifying the first network access entity from the mobile entity to the second network access entity which enables the second network entity to direct traffic to the first network entity. According to another embodiment, the invention also provides a method for the reverse direction. Namely, the invention provides a method for sending IP signaling from the mobile entity or from the first network access entity towards the second network access entity, whose global IP address is not known by the mobile entity or first network access entity.

31 Claims, 9 Drawing Sheets

OTHER PUBLICATIONS

"*3rd Generation Partnership Project; Technical Specification Group Services and System Aspects; General Packet Radio Service (GPRS); Service description; Stage 2 (Release 4)*", 3GPP TS 23.060 V4.7.0 (Dec. 2002).

3rd Generation Partnership Project; Technical Specification Group Services and System Aspects; Feasibility Study on 3GPP System to Wireless Local Area Network (WLAN) Interworking (Release 6), v. 6.1.0 (Dec. 2002).

EURESCOM Technical Information Specification, "Fast Handovers for Mobile IPv6," 2002 EURESCOM Participants in Project P1113.

An Analysis of the Fast Handovers for Mobile IPv6 Protocol, Janne Lundberg, Helsinki University of Technology, Laboratory for Theoretical Computer Science, May 28, 2003.

Mobile IP Working Group, Internet Draft, Mar. 1, 2003, "Fast Handovers for Mobile IPv6 draft-ietf-mobileip-fast-mipv6-06.txt".

Internet Engineering Task Force, Internet-Draft, "Mobility Related Terminology," J. Manner, M. Kojo, Unversity of Helsinki, Apr. 2003.

Internet Draft, "Recommendations for Achieving Seamless IPv6 Handover in IEEE 802.11 Networks," Paul Tan, ICR, Feb. 2003.

SeaMoby Working Group, Internet Draft, Document: draft-trossen-seamoby-cardiscovery, Dirk Trossen, Govind Krishnamurthi, Hemant Chaskar, Nokia Research Center, Eunsoo Shim, Richard D. Gitlin, Columbia University, Nov. 2001.

"Fast Handovers and Context Transfers in Mobile Networks," Rajeev Koodi, Charles E. Perkins, Oct. 2001.

* cited by examiner

ENHANCED FAST HANDOVER PROCEDURES

BACKGROUND OF THE INVENTION

1. Field of the Invention

This invention relates to a method and a system for handing over a connection of a mobile entity between two network access entities, in case a global address of one or both of the participating network access entities is not known to the mobile entity performing the handover.

2. Description of the Related Art

This invention is related to mobile IP networks, and in particular to performing a handover or a movement from one Access Router to another Access Router.

The invention relates to optimized IP-layer handovers (i.e. optimizations to Mobile IPv6) for seamless session mobility. More specifically, the invention is applicable for seamless session continuity during Inter-System handovers or complementary access IP layer handovers (e.g. seamless session continuity between WLAN and 3GPP systems as described in 3GPP TR 22.934 "Feasibility study on 3GPP system to Wireless Local Area Network (WLAN) interworking" (TR 22.934 v 5.1.0, December 2002)).

The IETF (Internet Engineering Task Force) is putting significant effort in the standardization of mobile solutions for IP (Internet Protocol) based networks, such as Mobile IP. The solution introduced by these standards may be complemented with other mechanisms, which are being also developed by IETF, in order to enhance the handover performance. For example, the Fast Handover Internet Draft "draft-ietf-mobileip-fast-mipv6-06.txt" (published on Mar. 1, 2003 (Work in progress)), may be used together with Mobile IPv6 to enhance the performance of the IP handover.

Further detailed information concerning Fast Handover can be found in the following documents, for example: "FAST HANDOVERS FOR MOBILE IPv6", EURESCOM Participants in Project P1113 by Sebastien Auvray, France Telecom; "Fast Handovers and Context Transfers in Mobile Networks" by Rajeev Koodli and Charles E. Perkins (Computer Communication Review, volume 31, number 5, October 2001. ISSN #0146-4833).; and "An Analysis of The Fast Handovers for Mobile IPv6 Protocol" by Janne Lundberg, Helsinki University of Technology, Laboratory for Theoretical Computer Science, May 28, 2003.

These solutions are designed independently of the underlying technology placed below the IP layer. Therefore they could be used for implementing an IP handover between two access technologies as far as both networks, previous access network and target access network, utilize the IP protocol at the network layer. A typical example is mobility across WLAN (Wireless Local Area Network) and GPRS (General Packet Radio Service) networks. Some access technologies (such as GPRS), however, exhibit certain characteristics that may have an impact on the functionality of the IP handover as will be explained in the following discussion.

During a normal session, a Mobile Node (MN) is attached to an Access Router (AR). An Access Router offers IP connectivity to mobile nodes and acts as a default router to the mobile nodes it is currently serving. A serving Access router is also referred to as a SAR (Serving Access Router). The Access Router may include intelligence beyond a simple forwarding service offered by ordinary IP routers. In case the MN wishes to perform a handover, there are usually some Access Routers to which the MN may perform a handover. These Access Routers are referred to as Candidate Access Router (CAR).

The Access Router which is chosen for the handover is referred to as Target Access Router (TAR). In detail, the TAR is the AR with which the procedures for the MN's IP level handover are actually initiated. The TAR is selected after running a TAR selection algorithm that may take into account parameters such as the capabilities of CARs, preference of the MN and any local policies. After the handover, the TAR becomes the (new) SAR.

After performing the handover, the old SAR, to which the MN was attached before, is referred to as the Previous Access Router (PAR), which is occasionally also referred to as the Old Access Router (OAR). The PAR is the (old) SAR that will cease or has ceased to offer connectivity to the MN.

Typically a MN is connected to the AR via an Access Point (AP). An Access Point is a layer 2 device which is connected to one or more Access Routers. Access Points are sometimes called base stations or access point transceivers. An AP may be a separate from AR or co-located with an AR.

In the Fast Handover procedure, a mobile node (MN) sends an F-BU (Fast Binding Update) message when it is about to move to the TAR. Once the PAR has received the F-BU message it starts to forward the incoming packets addressed to the MN towards the TAR. The F-BU is the last message sent by the MN before leaving the PAR. Also the MN can send the F-BU message after moving to the TAR (the first message sent after the movement) if it was not possible to send it before the movement took place.

The MN always knows the link local IP address of the PAR since the MN can learn this information from the router advertisement messages received from the PAR before the movement took place. This information allows the MN to send the F-BU message to the PAR addressed to the PAR's link local IP address while the MN is still attached to the PAR's link. However it cannot be assumed that the MN always knows the PAR's publicly routable global unicast IP address. Therefore, in the cases where the MN does not know the PAR's globally routable IP address, the MN will not be able to send the F-BU message to the PAR after it moves to the target network since it will not be able to address the F-BU properly (i.e. to the PAR's globally routable IP address).

This scenario is always present when the MN has to send the F-BU after moving to the target network and the previous access network is GPRS since the globally routable IP address of the GGSN (Gateway GPRS Support Node) is totally unknown for the GPRS UE's (it is assumed that GGSN acts as Access Router for the GPRS network).

The Fast Handover Internet Draft assumes that the MN knows the PAR's globally routable IP address. This assumption does not always apply, for example, when the previous access technology is GPRS (and as a result, the PAR is GGSN). No prior solution is known so far.

The above-mentioned problem, i.e., that the globally routable addresses of Access Routers participating in a handover are not known, has also an effect on other details of the handover procedure.

Several protocols are being designed (in IETF) for seamless IP-level handovers, such as Fast handovers and Context Transfer. Since these protocols constitute IP signaling between the current Access Router (AR) and Target Access Router (TAR), a critical requirement for these mechanisms to work is that the TAR for the Mobile Node's (MN) handover is known to the current AR (FIG. 1). The TAR identification problem is being studied in the IETF Seamoby WG (Workgroup) and is subdivided as follows:

Identification of the neighboring ARs in advance of handover (HO). This procedure is also known as Candidate Access Router discovery (CAR).

TAR selection (from the list of CARs) at time of HO.

These mechanisms require that the TAR IP address is known for current AR in order to perform a handover. In some situations, this may not be possible/desired for any of the following reasons:

The TAR resides in a different administrative domain which wants to keep its internal addressing information confidential from other administrative domains.

The TAR resides in a private IP addressing domain (i.e. the TAR does not have a publicly routable IP address).

Determination of the TAR requires some access-technology specific procedures.

Hence, in these cases it is not possible to perform a handover to the TAR.

SUMMARY OF THE INVENTION

The invention enables a handover even in the case where a global address of one, or both, of the participating network access entities is not known to a mobile entity attempting the handover and/or to another network access entity participating in the handover.

Two of the scenarios in which the invention may be useful is as follows:

an IP packet needs to be sent to a previous network access entity whose global IP address is not known neither to the current network access entity, nor to the mobile entity.

An IP packet needs to be sent to a target network access entity whose IP address is not known neither to the current network access entity, nor to the mobile entity.

For the first scenario, according to the embodiment the invention provides a method for handing over a connection of a mobile entity from a first network access entity to a second network access entity, wherein a global address of the first network access entity is not known to the mobile entity. The method includes the step of sending a message including information for identifying the first network access entity from the mobile entity to the second network access entity, which enables the second network entity to direct traffic destined to the first network entity.

According to an alternative embodiment, the invention provides a network system including at least one mobile entity, a first network access entity and a second network access entity, wherein a global address of the first network access entity is not known to the mobile entity. The mobile entity is configured to send a message including information for identifying the first network access entity to the second network access entity which enables the second network entity to direct traffic to the first network entity.

According to a further embodiment, a network system is provided. The network system includes at least one mobile entity and a first network access entity. The network system also includes a second network access entity, wherein a global address of the first network access entity is not known to the mobile entity. The mobile entity is configured to send a message including information for identifying the first network access entity to the second network access entity which enables the second network entity to direct traffic to the first network access entity.

According to a further embodiment, a network system including a mobile entity and a first network access entity. The network system includes a second network access entity, wherein a global address of the second network access entity is not known to the mobile entity. The mobile entity is configured to send a message including information for identifying the second network access entity to the first network access entity, which enables the first network access entity to direct traffic to the second network entity.

BRIEF DESCRIPTION OF THE DRAWINGS

The objects and features of the invention will be readily understood with reference to the following description and the attached drawings, wherein.

DETAILED DESCRIPTION OF THE PREFERRED EMBODIMENTS

According to a first embodiment, a change of connection (i.e., a handover or a movement) of a mobile entity from a first network access entity to a second network access entity is performed such that the mobile entity sends a message including information for identifying the first network access entity to the second network which enables the second network entity to acquire a global address of the first network entity. That is, in case the global address of the first network access entity is necessary to accomplish the handover and the mobile entity (e.g., Mobile IPv6 Mobile Node MN) does not know the global address, the mobile entity sends known information associated with the first network access entity known to the second network entity. By using this information, the second network entity is capable of acquiring the global address of the first network access entity, such that the handover or movement procedure can be completed.

It is noted that in the context of this application the term "global address" refers to an address that has significance in the TAR (Target Access Router as an example for the second network entity) network (i.e. an address that can be used to reach the PAR (Previous Access Router as an example for the first network entity) from the TAR). That is, a "global address" refers to an address, which is generally known (or available) in the network. In contrast thereto, the term "local address" refers to an address which is only available locally, i.e., only in a part of the network. For example, the link local address of the first network access entity (e.g., PAR) may be used only in the mobile entity which resides on the same link.

Figure 1:
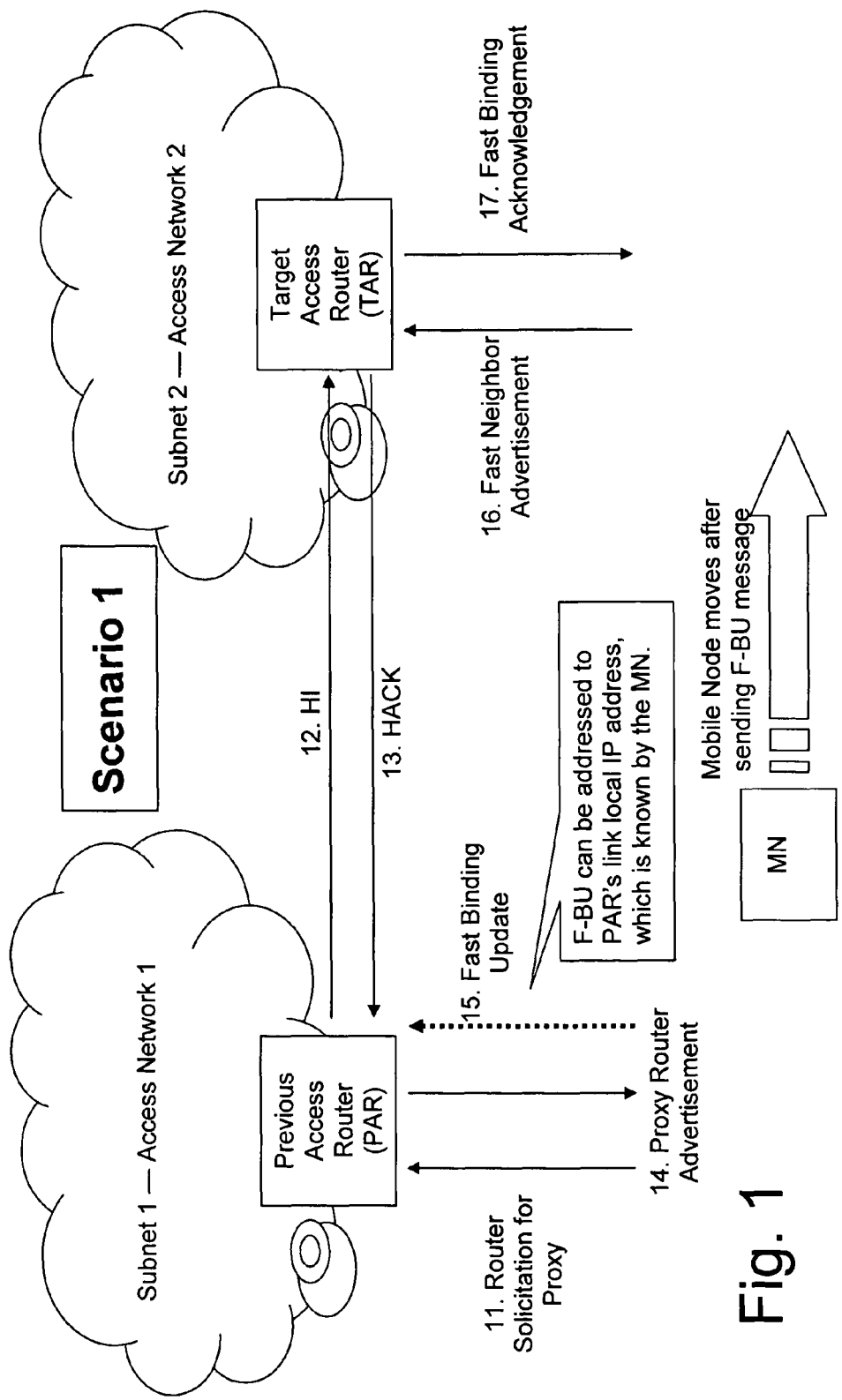
FIG. 1 shows a first scenario for a Fast Handover procedure.
Figure 2:
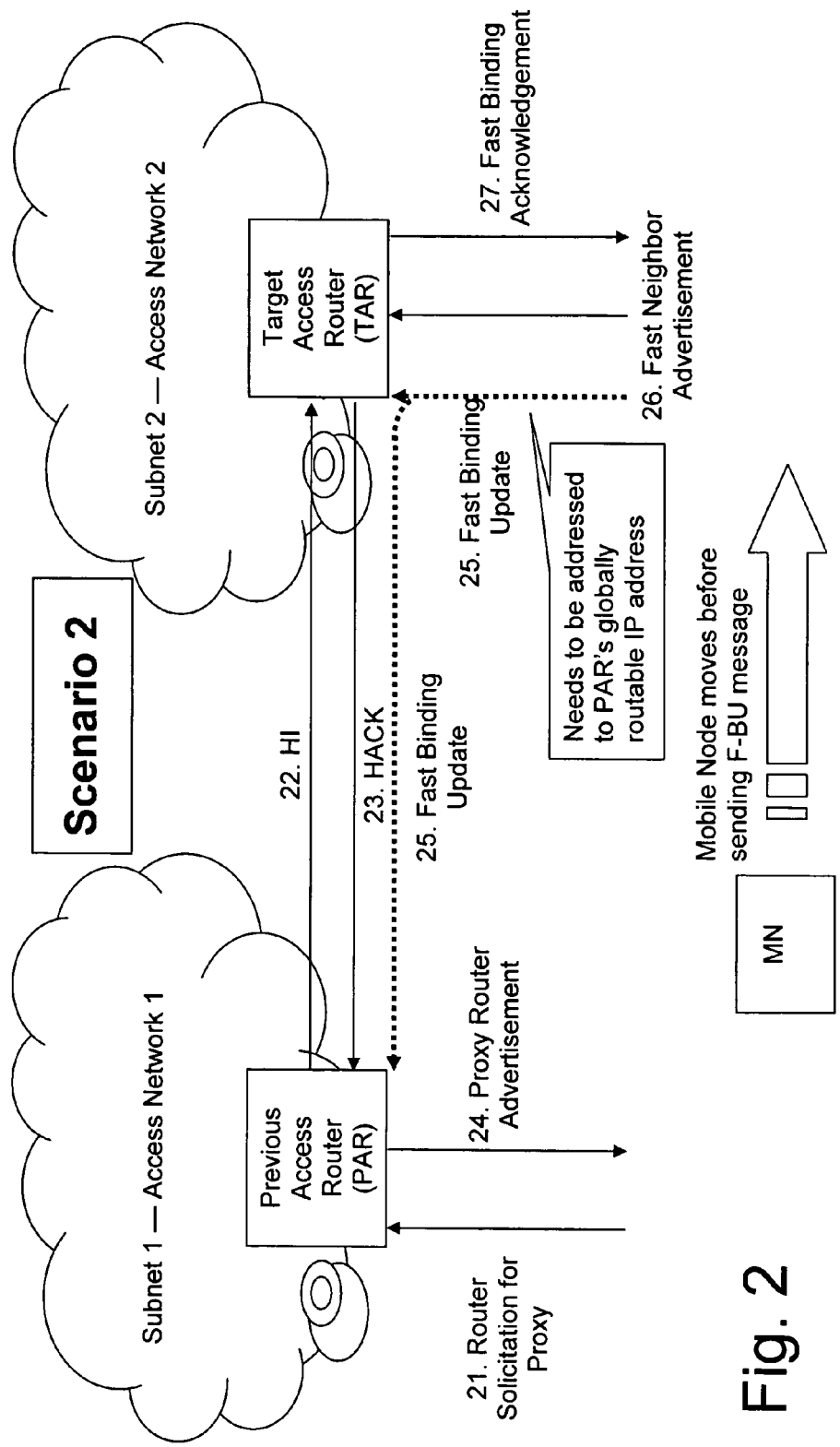
FIG. 2 shows a second scenario for a Fast Handover procedure, to which the first embodiment can be applied.
Figure 3:
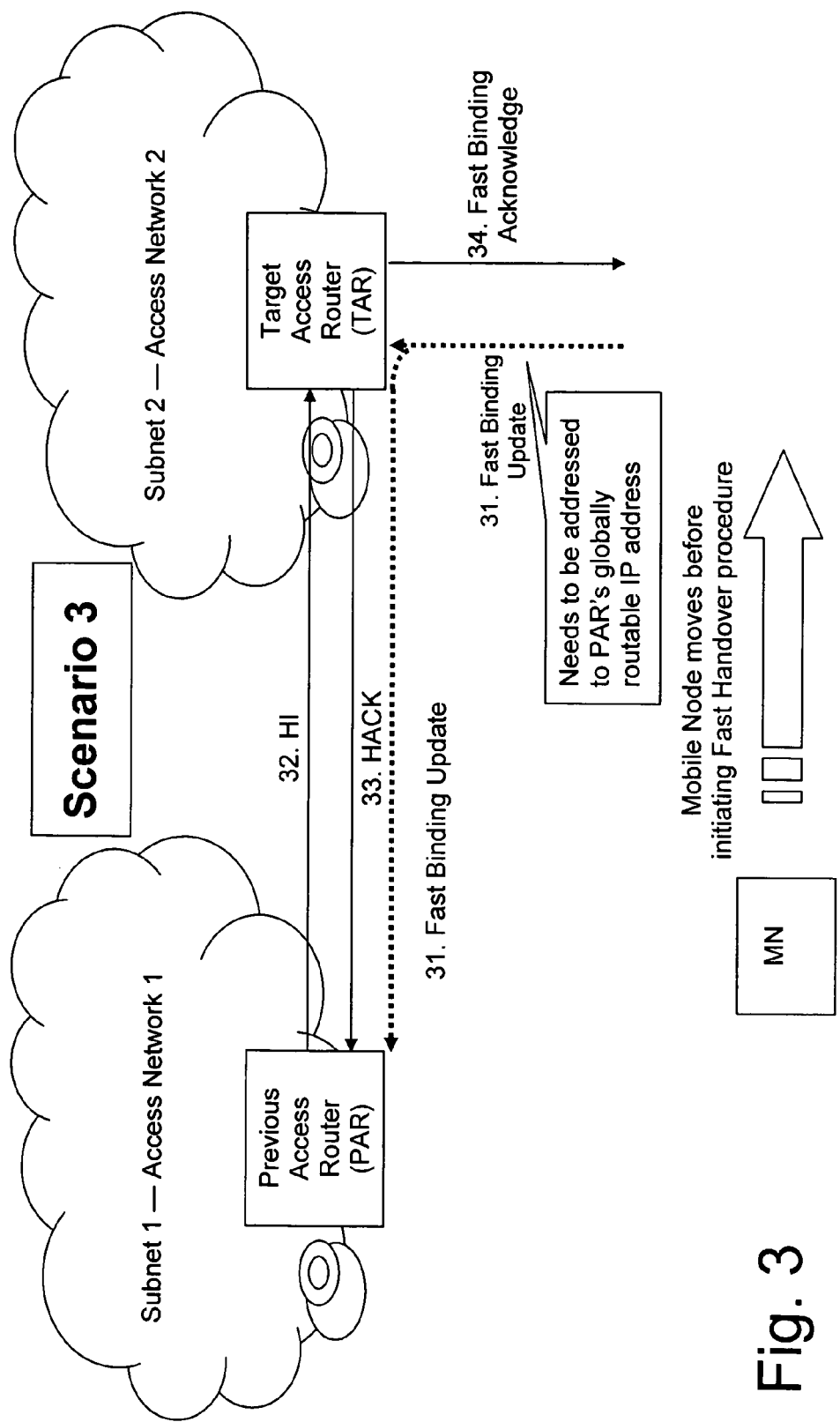
FIG. 3 shows a third scenario for a Fast Handover procedure, to which the first embodiment can be applied.

FIG. 1, FIG. 2 and FIG. 3 show different scenarios for the Fast Handover procedure discussed above.

In these scenarios, it is assumed that a Mobile node (MN) moves from a Previous Access Router (PAR) as an example for a first network access entity to a Target Access Router (TAR) as an example for a second network access entity. It is assumed that the PAR is located in a Subnet 1—Access Network 1, and the TAR is located in a Subnet 2—Access Network 2.

It is noted that the figures do not show all the elements involved in the signaling process. For example, the APs are located in between the Access Routers and mobile nodes.

FIG. 1 illustrates a scenario of a so-called scenario for an "Anticipated case". That is, here, a Fast Handover procedure is initiated before the movement.

The handover is initiated by the MN by sending a Router Solicitation message for the proxy (RtrSolPr) to the PAR in message 11. This is a message from the MN to the PAR requesting information for a potential handover. The PAR sends a Handover Initiate message (message 12) to the TAR. As a response to the HI message, the TAR sends a HACK (Handover Acknowledgement) message to the PAR (message 13). After receiving the HACK message from the TAR, the PAR sends a Proxy Router Advertisement message to the MN (message 14). The Proxy Router Advertisement (PrRtAdv) is a message from the PAR indicating a MN to undergo the handover.

Thereafter, the MN sends a Fast Binding Update (F-BU) message 15 to the PAR. The Fast Binding Update (F-BU) message is a message from the MN instructing its PAR to redirect its traffic towards the NAR, i.e., TAR. Thus, this message is important to complete the handover.

After the movement, the MN sends a Fast Neighbor Advertisement message to the TAR. The Fast Neighbor Advertisement (FNA) is a message from the MN to the NAR (here TAR) to confirm use of a NCoA (New Care of Address) when the MN has not received the Fast Binding Acknowledgement (FBACK). Namely, in this example the PAR has not sent a FBACK message to the MN because it has just moved to the TAR. In response to the FNA message 16, the TAR sends a FBACK message (message 17) to the MN. By this message, the Fast Handover procedure is completed.

It is noted that a Care of Address (CoA) is a temporary address allocated for the MN while it is visiting foreign networks. Home Agent maintains a binding between the static Home address of the MN and the current CoA.

Hence, in scenario 1 shown in FIG. 1 the MN sends the F-BU message 15 while it is still attached to the previous access network. The MN thus does not have any problem when sending the F-BU message to PAR since it is located in the same link as the PAR. The MN uses the PAR's link local IP address to address the F-BU to PAR.

In FIG. 2, scenario 2 is illustrated where the messages 21 to 24 correspond to the messages 11 to 14 shown in scenario in FIG. 1. However, in FIG. 2 the MN sends the F-BU message (message 25) after it has moved to the TAR. This message, however, must be directed to the PAR, since the PAR has to be requested to redirect the traffic of the MN (packets addressed to the old CoA of the MN) to the TAR. Thus, the TAR has to forward the F-BU message to the PAR in message 25. In the case where the MN does not know the PAR's globally routable IP address, the MN cannot address the F-BU message properly to PAR unless the solution according to the this embodiment of the invention is used.

Namely, as will be explained later in detail, the information which the MN additionally inserts into the F-BU message is used in order to determine the globally routable IP address of the PAR.

After sending the F-BU message 25, the MN can send a FNA message (message 26) to the TAR, which can respond with a FBACK message (message 27) in order to complete the Fast Handover procedure.

It is noted that the FNA is sent after the MN reaches the new access network. It is used to start the delivery of buffered packets from the TAR to the MN. FBU starts the forwarding of packets from the PAR to the TAR. At this point the TAR buffers the packets until the MN arrives to the new access network. When the MN reaches the TAR, the sending of the FNA starts the delivery of those buffered packets from the TAR to the MN.

FIG. 3 illustrates scenario 3 for a so-called "Non-Anticipated case", i.e., the Fast Handover procedure is initiated after the movement.

That is, in this case the Fast Handover procedure starts by sending a F-BU message (message 31) from the MN to the TAR. This F-BU message has to be forwarded to the PAR, similar to the case shown in FIG. 2. After this, the PAR sends a HI message (message 32) to the TAR, and the TAR responds with a HACK message (message 33). Thereafter, the TAR sends a FBACK message (message 34) to the MN to complete the Fast Handover procedure.

Thus, in scenario 3 the MN starts the Fast Handover procedure by sending a F-BU message after the movement. In the case the MN does not know the PAR's globally routable IP address the MN cannot address the F-BU message properly to the PAR unless the solution according to the present embodiment of the invention is used.

Figure 4:
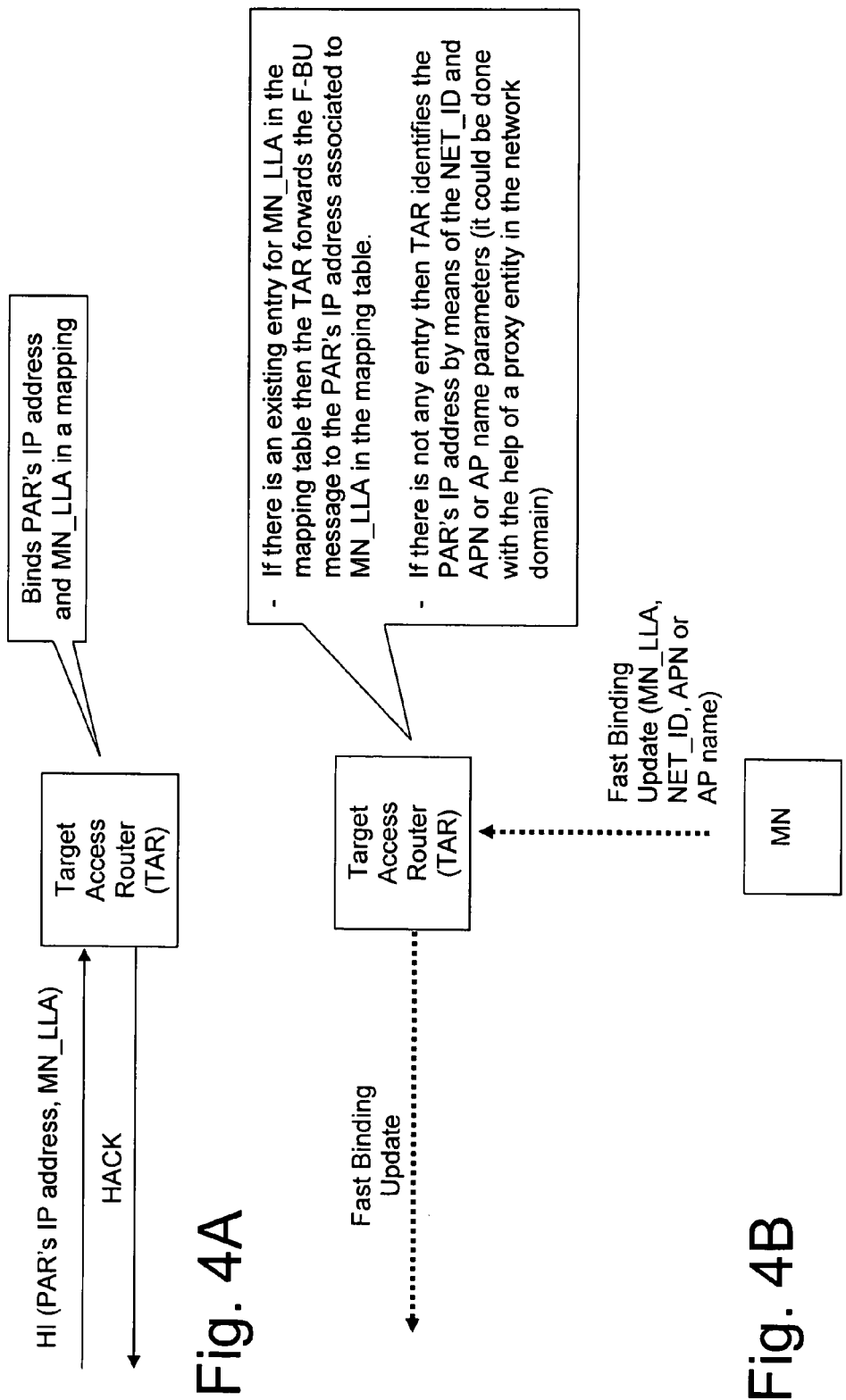
FIGS. 4A and 4B show a general procedure for the solution according to the first embodiment.

FIGS. 4A and 4B illustrate the general procedure for the solution described in this invention.

In general, in the "Anticipated case" of the Fast Handover procedure, the so-called MN_LLA (which carries the MN's link-layer identity, such as MAC address) option must be included in all the RtrSolPr, HI and F-BU messages of the Fast Handover procedure. This will enable the TAR to map the MN_LLA with the PAR's publicly routable global unicast address as described below.

The MN-LLA is the Link-layer address of the MN, and is in particular the link-layer address of the MN that is undergoing handover to the destination. According to the above referenced Fast Handover Internet Draft ("draft-ietf-mobileip-fast-mipv6-06.txt"), this option should be included to help the destination recognize the MN when it connects to the destination.

FIGS. 4A and 4B illustrate are embodiments of the method of the invention. Two possible scenarios, the "anticipated case" and "non-anticipated case" (as described in FIG. 2 and FIG. 3) are considered:

"Anticipated Handover" case (FIG. 4A): when the TAR receives a HI message, the TAR maps the source IP address of the packet (PAR's publicly routable global unicast IP address, which is reachable from the TAR) with the MN_LLA included in that message. This is a feature according to this embodiment for an AR implementing the Fast Handover functionality.

"Non-anticipated handover" case (FIG. 4B): as described above with respect to FIG. 3, in the case where the F-BU message was not sent before the movement, the MN sends the F-BU message to the PAR after the movement. This message is addressed to the PAR at the IP level but the Layer 2 (L2)

frame is targeted to the TAR interface (next step in the routing path). The MN includes the following information in the message:

Destination Address (D.A.): the link local address of the PAR (as specified in the above referenced Fast Handover Internet Draft)

Source Address (S.A.): the MN_PCoA, i.e., the Previous Care of Address of the Mobile Node (as specified in the above referenced Fast Handover Internet Draft)

At this point the NAR cannot forward the F-BU message to the PAR since the link local address is not globally routable and the NAR does not know the PAR's public IP address.

Thus, according to the first embodiment of the invention, some parameters are included in the F-BU message whose goal is to enable the TAR to forward the F-BU message to the correct PAR: These parameters may be considered optional since they are only useful for the case where the MN sends the F-BU after the movement ("non-anticipated handover" case). According to this embodiment, the parameters are as follows:

Old NET_ID: Network identity of the previous access network.

Old APN_name|old AP_name: name of (GPRS) APN (Access Point Name) or (WLAN) AP (Access Point) which the MN was connected to in the previous access network.

MN_LLA: link layer address of the MN.

For example, the old network identity may be a PLMN ID (Public Land Mobile Network identity).

After receiving the F-BU, the TAR checks the destination address (D.A.) of the packet. It realizes that the target IP address is a link local IP address (characterized by a prefix of FE80) which does not belong to itself. The TAR thus checks in a mapping table to determine whether there is an entry for the MN_LLA, which is included by the MN in the F-BU. The mapping table is created by mapping the PAR's publicly routable global IP address with the MN_LLA (information received into the HI message, as described above).

In case there is an entry in the mapping table for the MN_LLA (i.e. HI message was already received by TAR) and the PAR has revealed its IP address, then the TAR obtains the PAR's IP address associated and forwards the F-BU message directly to the PAR (IP encapsulation can be used for the forwarding). This embodiment would apply for scenario 2 (anticipated case).

In case there is not any entry in the mapping table for the MN_LLA, then the TAR forwards the F-BU message to the PAR, whose publicly routable global unicast address is determined with the help of the "old NET_ID" and "APN_name|old AP_name" options included by the MN in the F-BU message. The NAR may need the assistance of a node acting as a proxy in order to be able to perform this mapping which is described later by referring to a second embodiment of the invention. After the publicly routable global unicast IP address of the PAR is determined, the F-BU message can be forwarded to the PAR (e.g. Via IP-in-IP encapsulation). This embodiment would apply for scenario 3 (non-anticipated case).

As a modification of the first embodiment, a situation can be handled in which the globally routable address of the TAR is not know to the MN. That is, in this modification, the roles of the PAR and the TAR with respect to determining a globally routable address are exchanged.

The address of the TAR can be determined basically in the same way as according to the first embodiment.

When the mapping according to the first embodiment is applied, the PAR holds a mapping table in which the information for identifying the TAR received from the MN is mapped to a global address of the TAR.

In the following, a second embodiment of the invention is described. The second embodiment is directed to TAR identification.

Figure 5:
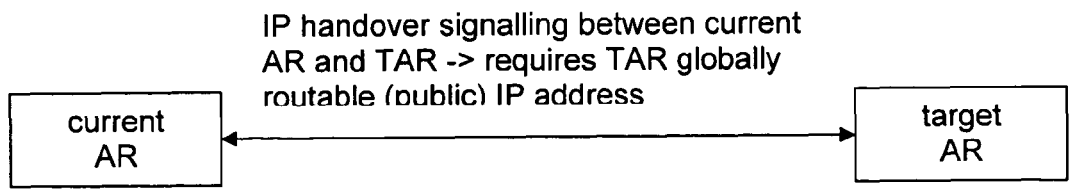
FIG. 5 shows a handover signaling between a current Access Router (AR) and a Target Access Router (TAR) according to the prior art.

As mentioned above, the TAR identification mechanism requires that the current AR determines the IP address of the TAR for the MN's handover. This is illustrated in FIG. 5, for example. FIG. 5 depicts the basic interaction at the IP layer between the current AR and the TAR. That is, the IP handover signaling between the current AR and the TAR requires that the current AR knows the target AR globally routable (public) IP address. It is noted that also the TAR needs the address of the PAR.

Figure 6:
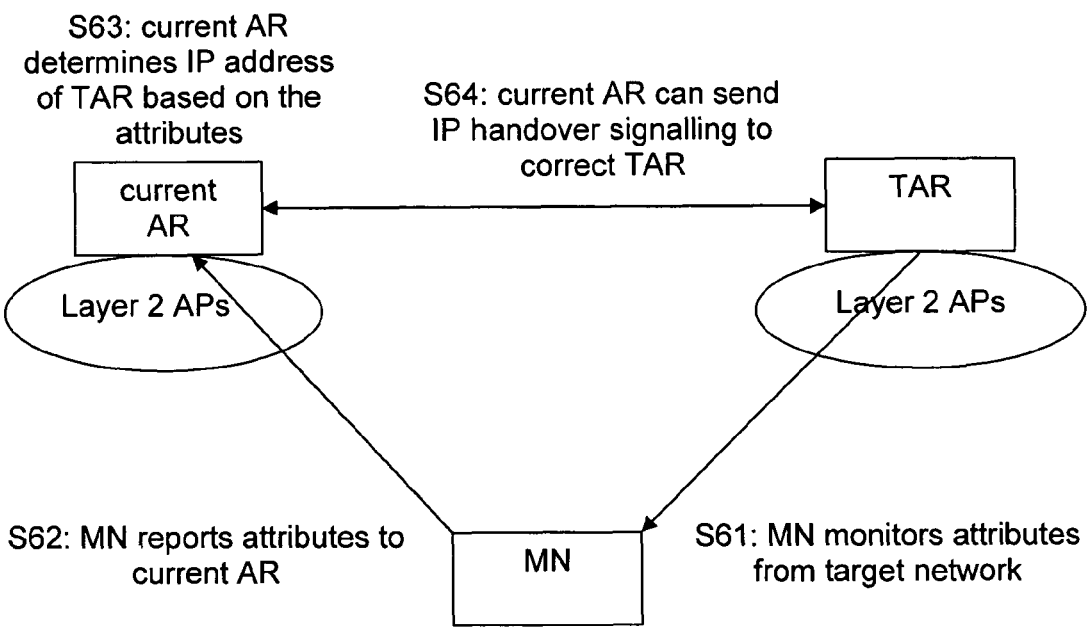
FIG. 6 illustrates TAR IP address discovery according to a simple example according to the second embodiment.

FIG. 6 shows an example of a high level schematic of the TAR IP address discovery. In particular, a situation is illustrated in which the globally routable (public) IP address of the TAR is not known to the MN. A mobile node MN is attached to a current AR and wishes to perform a handover to a TAR (target AR). In FIG. 6 it is illustrated that the corresponding access points are Layer 2 Access Points (e.g. WLAN AP's). According to this example, a similar procedure as according to the first embodiment is adopted. Namely, the MN delivers information to the corresponding AR in order to identify the other AR (in this case, the TAR). In particular, in step S61, the MN monitors attributes (e.g., target WLAN AP MAC address) from the target network point of attachment which will help to identify the TAR IP address. In step S62, the attributes are reported to the current AR. In step S63, the current AR determines the IP address of the TAR based on the attributes passed by the MN. Thus, in step S64, the current AR can send the IP handover signaling to the correct TAR.

It is noted that step S63 requires that the AR has access to a mapping table which maps Layer 2 IDs (e.g. WLAN AP MAC addresses) to the corresponding AR IP address. However, this will not work for the GPRS, since a given cell ID will not always map to the same GGSN—depending on what Access Point Name (APN) the MN is going to access. In the GPRS, the APN is a logical name describing the actual connected access point to the external packet data network according to DNS naming conventions. It refers to the GGSN to be used.

As mentioned above, this requires that the current AR knows the globally routable IP address of the TAR. In some situations, however, this may not be possible/desired for any the following reasons.

A first reason is that the TAR resides in a different administrative domain which wants to keep its internal addressing information confidential from other administrative domains. For example when a MN is moving from the WLAN to the GPRS, the TAR will be a GGSN in the GPRS network. If the WLAN is not administered by the GPRS operator (for example WLAN is administered by a University and the GPRS is administered by an Operator X), the GPRS operator (Operator X) is most likely unwilling to reveal its internal addressing (GGSN IP address) to the WLAN operator (University). Such information could be used, for example, to mount Denial of Service (DoS) attacks on the GGSN. In addition, the GGSN addressing information may be considered as confidential information by the GPRS operator.

A second reason is that the TAR resides in a private IP addressing domain (i.e. the TAR does not have a publicly routable IP address). Another possibility is that the TAR does not have a globally routable IP address. This IP address, thus, cannot be used by the current AR for addressing the TAR (unless the current AR and TAR reside in the same private IP addressing space).

A third reason is that the determination of the TAR requires some access-technology specific procedures.

In addition to the above, there exist additional problems which are solved according to the second embodiment. The following problems may be addressed by the second embodiment:

One problem is that in the Inter system handover WLAN to GPRS, the MN's target GGSN (TAR) will depend on the APN which the MN will access. As a result, the Layer 2 Access Point Identifier to TAR IP address mapping mechanism, will not work. Since in GPRS, the target GGSN depends on APN, the WLAN AR would need to be aware of APN-to-GGSN mappings which are typically maintained in a Domain Name Server (DNS) server in the GPRS operator's network.

Another problem is that in some Access Networks, the determination of the TAR IP address requires some access-network specific functions. It is highly undesirable to expose these functions to other access networks. For example, determining the TAR in the GPRS means identifying the IP address of the target GGSN. In the GPRS, the target GGSN depends on the APN that the MN wants to access. The GPRS to APN mapping is determined by the Serving GPRS Support Node (SGSN) by performing a DNS query. Once again, if the WLAN is not administered by the GPRS operator, the GPRS operator is highly unlikely to be willing to allow the WLAN operator to perform DNS query on its internal nodes. In addition, it would be desirable to maintain the GPRS specific details transparent from the WLAN network. It would be, thus, beneficial if the WLAN operator could avoid having to perform any GPRS specific operations in order to determine the target GGSN IP address.

Figure 7:
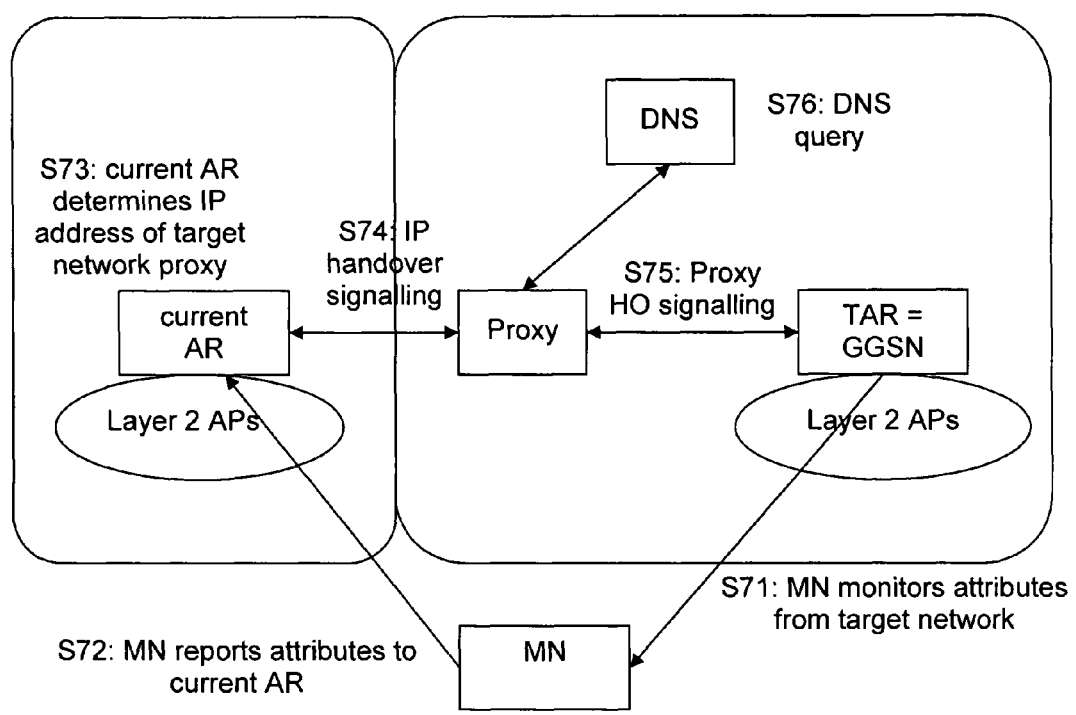
FIG. 7 illustrates TAR IP address discovery based on a proxy function in the target network according to the second embodiment.

According to the second embodiment of the invention, a proxy function between administrative domains is introduced in order to allow the current AR to perform the required IP signaling towards the TAR (e.g. Fast Handover or Context Transfer signaling) without revealing the IP address of the TAR to the current AR (FIG. 6). In addition to this, the proxy function hides whatever access-network specific procedures are required in order to determine the TAR IP address. As a result, all target access networks will look the same from the current Access Router point of view. All the access specific functions are performed by the proxy residing in the specific access network. This is shown in FIG. 7.

The MN delivers an information container containing access specific attributes about the target access network (step S72). For this, the MN monitors the attributes from the target network point of attachment which will help to identify the TAR IP address (e.g., target network PLMN ID) in step S71.

The current Access Router uses some of these attributes to identify the target access network and corresponding proxy, and passes the rest of the attributes transparently to the identified proxy. In detail, in step S73 the current AR determines the IP address of the target network proxy corresponding to the attribute parameters passed by the MN (e.g., PLMN ID), and, in step S74, the IP handover signaling takes place between the current AR and the proxy.

The proxy then performs all the target access network specific procedures required for determining the target Access Router IP address. The same node may also additionally proxy all the IP signaling between the current and target Access Routers. Namely, the target Access Router IP address is neither revealed to the current Access Router, which may be administered by a different operator, nor to the MN. From the current Access Router's point of view, the node will appear as if it was communicating directly with the target Access Router, or more specifically, with a target Access Router which resides in the same access technology.

In detail, in step S75, the proxy performs access network specific function required for mapping the TAR IP address. In the GPRS case this means a DNS (Domain Name Server) query based on APN. Then, in step S76, the proxy proxies the IP HO (Handover) signaling between the current AR and the TAR (which is, in the GPRS case, a GGSN).

Thus, as illustrated in the example shown in FIG. 7, the proxy entity performs all the access specific functions required for determining the TAR IP address. The proxy also hides the GPRS internal addressing from the WLAN network entities.

Figure 8:
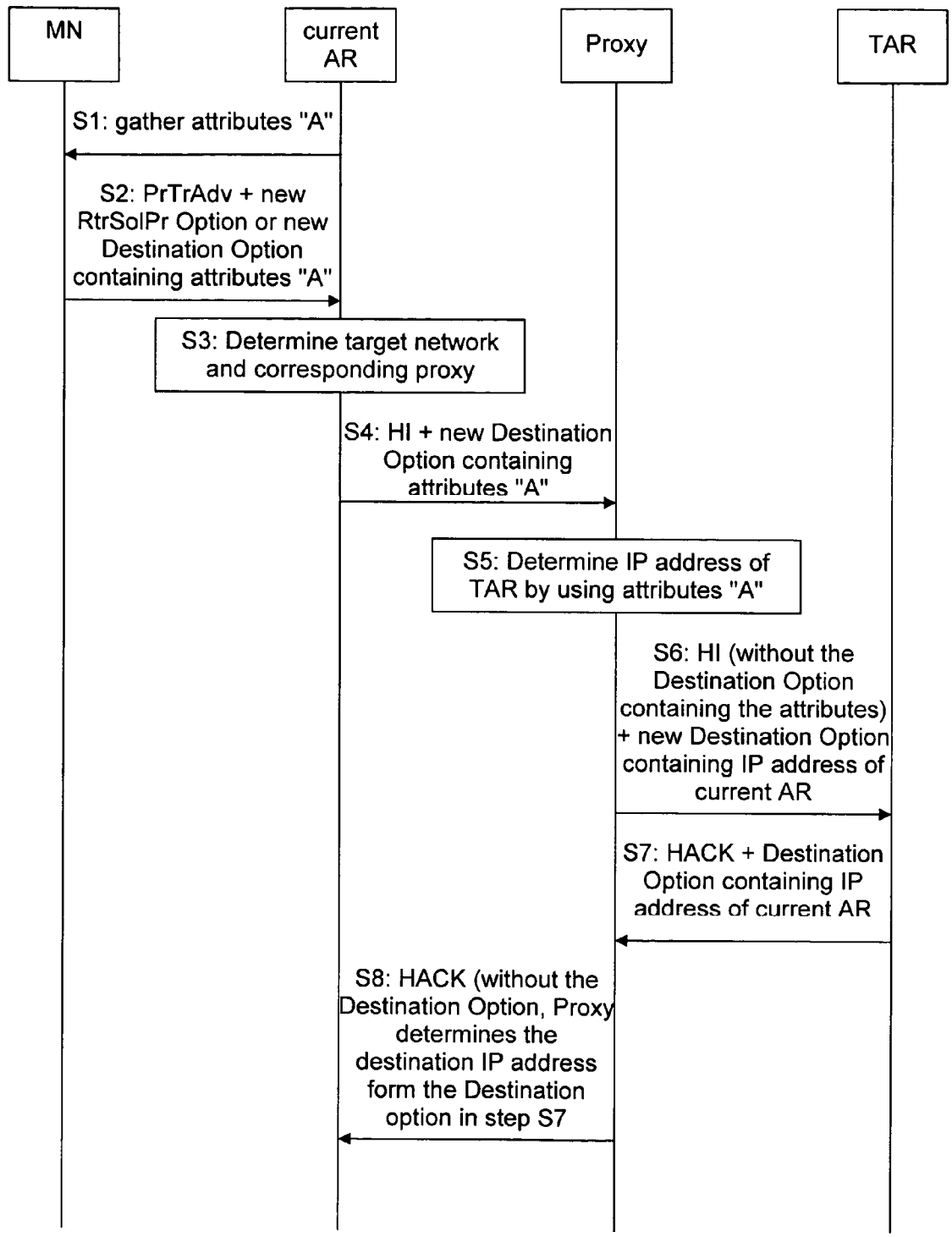
FIG. 8 shows a signaling flow of the TAR IP address discovery based on the proxy function in the target network according to the second embodiment.

The procedure according to the present embodiment of the invention will be described in more detail with reference to a specific scenario of WLAN to GPRS handover as illustrated in FIG. 8. FIG. 8 shows signaling flow of the TAR IP address discovery based on the proxy function in target network. It is noted that the messages "RtrSolPr" (Router Solicitation for Proxy), "HI" (Handover Initiate) and "HACK" (Handover Acknowledgement) are also described in the first embodiment, and are also described in Fast Handovers for Mobile IPv6 "draft-ietf-mobileip-fast-mipv6-06.txt", for example.

As a pre-requisite to the following steps, the current AR needs to have access to a table "T" which maps the identities of potential target networks (e.g. PLMN IDs) to the IP address of the corresponding proxy (e.g. for signaling to Operator Y use proxy IP address Z).

In step S1, the MN gathers attributes "A" useful in identifying target network point of attachment (e.g., PLMN ID+APN). That is, the MN determines information about its target network point of attachment, by monitoring broadcast channels (also known as beacon in cellular systems) for example. The level of information that the MN can determine depends on the terminal capabilities and the type of target access network.

In step S2, the MN sends the identified parameters about target GGSN to the current AR (i.e. the WLAN AR). These can be embedded in the RtrSolPr message in Fast Handovers, for example. The MN may need to include additional parameters required for identifying the TAR. In the GPRS case the MN may need to report the Access Point Name (APN) that the MN's applications will require when using the GPRS access, for example. In particular in the RtrSolPr message, an additional RtrSolPr Option or a new Destination Option containing the attributes "A" gathered in step S1 could be added.

In step S3, the current AR (in this example, the WLAN AR) determines the target GPRS network (from the parameters passed by the MN) and identifies the address of the corresponding proxy from a list of available proxies (the WLAN network operator maintains a list of potential target networks and corresponding proxies in a table "T", as described above). That is, the WLAN AR uses some of the attributes "A" (e.g., PLMN ID) to determine target network and corresponding proxy.

In step S4, the MN sends the message intended for the GGSN (e.g., HI message in fast handovers) to the IP address of the identified proxy in step 3. This message contains a destination option including the parameters which can be used to identify the target GGSN (these parameters are the same ones passed by the MN in step S2). That is, the MN sends a HI message plus new Destination Option containing attributes "A" copied from the RtrSolPr message in step S2.

In step S5, the proxy extracts the information from the destination option and determines the GGSN IP address corresponding to the parameters passed by the WLAN AR. For the specific case of the WLAN to GPRS handover, this may be implemented by performing a DNS query in the GPRS network, based on the APN contained in the message received by the proxy. This is illustrated in FIG. 7 by step S75.

Figure 9:
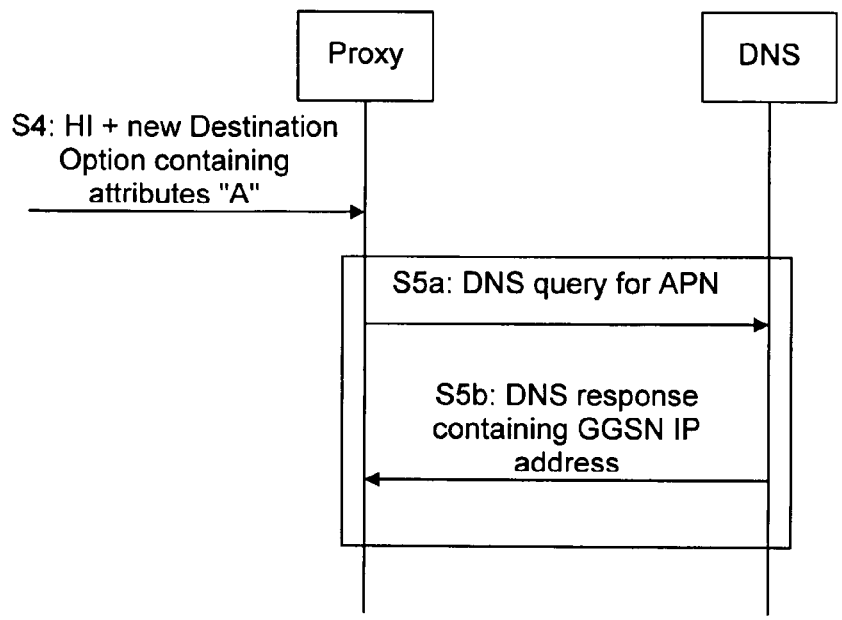
FIG. 9 shows details of step S5 of the signaling flow of FIG. 8.

In addition, this feature is also illustrated in FIG. 9, which provides further details of step S5 in FIG. 8 which illustrates the case in which the target network is using the DNS for solving the address of the Target Access Router. Namely, in step S5a, the proxy sends a DNS query for the APN to a DNS. In the case where the DNS successfully determines the IP address, it sends a DNS response containing the TAR IP address in step S5b to the proxy.

In step S6 the proxy forwards the message received from the WLAN AR (excluding the destination option) to the identified GGSN. This message needs to include a new ID option which helps the proxy identify to which WLAN AR it should send the corresponding response. In order to allow this, the AR also needs to maintain a temporary state which maps the WLAN AR IP address (read from the source address of the incoming packet) to the message ID used in the message forwarded to the GGSN. Alternatively, the message ID could be equal to the WLAN AR IP address. In this case, the proxy does not need to maintain any state. Hence, in step S6, the proxy sends a HI message (without the Destination Option containing the attributes) plus a new Destination option containing the IP address of the current AR, which was extracted from the IP header of the message sent in step S4.

In step S7, the TAR (in this case, the GGSN) receives the message, and performs the necessary actions. The GGSN sends the reply message to the proxy. The message must include a copy of the message ID option, in order to help the proxy identify to which WLAN AR to forward the message. That is, the GGSN sends a HACK message plus a Destination option containing the IP address of the current AR, which was copied from the message sent in step S6.

In step S8, the proxy receives the response message, strips off the message ID option and uses it to determine the target WLAN AR which the response should be forwarded to. The proxy then forwards the response message to the intended WLAN AR which sent the request message. That is, in step S8, the proxy sends a HACK message (without the Destination Option), and the proxy determines the destination IP address from the Destination Option in the message sent in step S7.

In the following, the effects of the second embodiment with respect to the security associations required are described.

Figure 10:
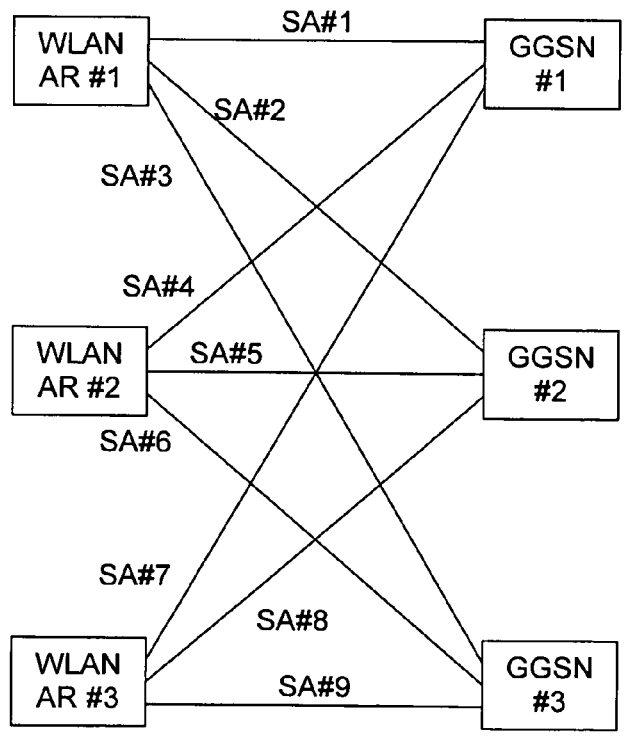
FIG. 10 shows security associations required when using a solution without the proxy according to the second embodiment.

FIG. 10 shows security associations required for the "standard solution", in case no proxy as according to the second embodiment is used.

In general, IP mobility signaling between Access Routers requires a Security Association between the Access Routers so that the IP mobility signaling can be protected. FIG. 10 illustrates that for the "standard solutions" $n^2$ Security Associations are required for n geographically adjacent Access Routers. In the example shown in FIG. 10, three WLAN Access Routers (indicated in FIG. 10 by WLAN AR #1 to WLAN AR #3) bordering a region covered by three GGSNs (indicated in FIG. 10 by GGSN #1 to GGSN #3) leads to a requirement of $3^2=9$ Security Associations (indicated in FIG. 10 by SA #1 to SA #9). This leads to an exponential complexity.

Figure 11:
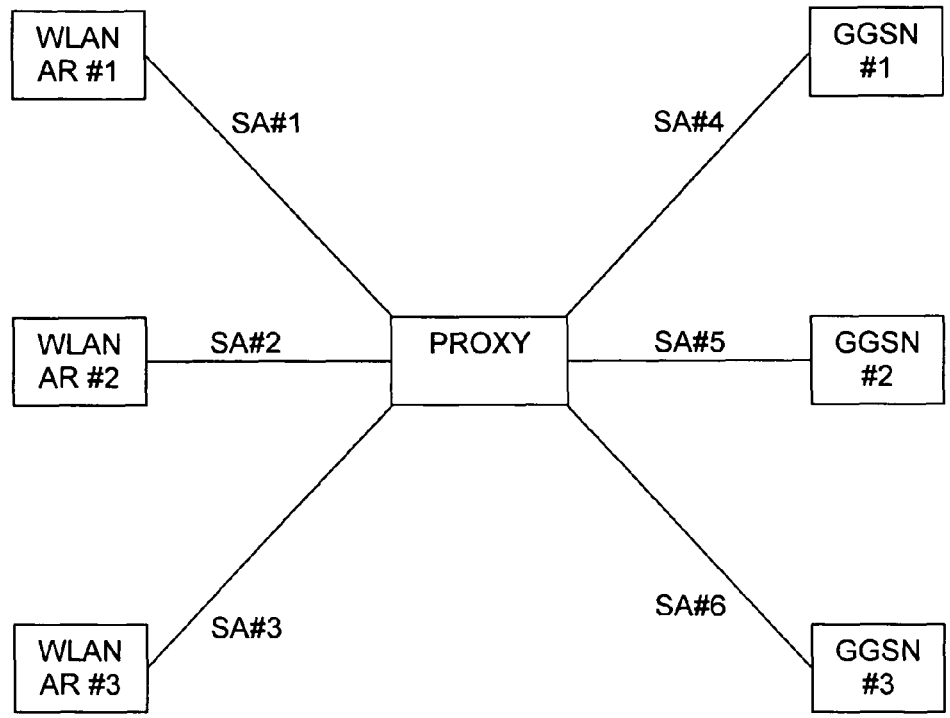
FIG. 11 shows security associations required when using the proxy according to the second embodiment.

FIG. 11 illustrates security associations required for the solution according to the second embodiment.

According to the second embodiment, a Security Association is only required between the proxy and each Access Router. This leads n Security Associations required for n geographically adjacent Access Routers, which corresponds to a linear complexity. In the example of FIG. 11, again three WLAN Access Routers and three GGSN are shown. Here, only six Security Associations are required.

As a modification of the second embodiment, also here the reversed case can be applied, similar to the modification of the first embodiment.

The invention is not limited to the embodiments described above but can vary within the scope of the claims.

For example, the above embodiments can be freely combined.

In particular, the proxy function described in the second embodiment can be used for the procedure according to the first embodiment and according to the modification of the first embodiment.

Namely, in case there is not any entry for the MN_LLA in the procedure according to the first embodiment as illustrated in FIG. 3, for example, the TAR forwards the F-BU message to the PAR, whose publicly routable global unicast address is determined with the help of the "old NET_ID" and "APN_name|old AP_name" options included by the MN in the F-BU message. In this case, the NAR may need the assistance of a node acting as a proxy in order to be able to perform this mapping. This node can be the proxy as described in the second embodiment.

Figure 12:
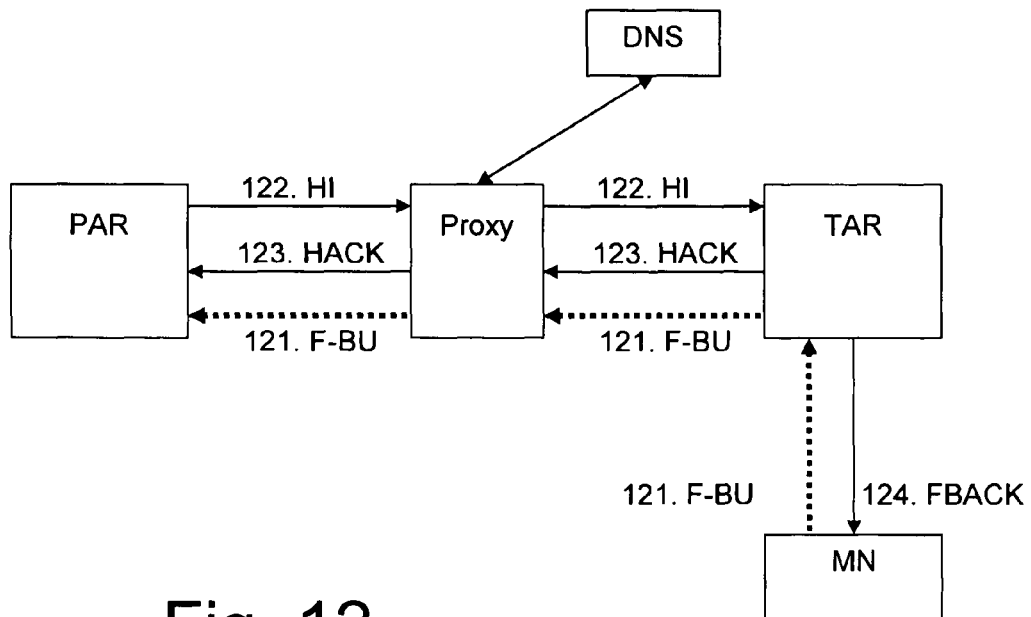
FIG. 12 shows a combination of the first and the second embodiment according to which a proxy is used to determine the global address of the PAR.

FIG. 12 illustrates this case. Here, a similar situation as in FIG. 3 is shown (Scenario 3), wherein, however, a proxy is used. In message 121 the F-BU message including the parameters described in the first embodiment is sent from the MN to the TAR. In contrast to the first embodiment, the TAR does not try to determine the globally routable IP address of the PAR but forwards the F-BU message to the proxy. Now, the proxy determines the globally routable IP address of the PAR, if necessary, with the help of a DNS query. After obtaining the address, the proxy forwards the F-BU message to the PAR.

After this, also the HI message (message 122) is forwarded to the TAR via the proxy, and also the HACK message (message 123) is sent from the TAR to the PAR via the proxy. That is, it is not necessary that the globally routable IP address of the PAR is known to the TAR or the MN. In order to complete the handover procedure, the FBACK message is sent to the MN in message 124, similar to message 34 in FIG. 3, for example.

Moreover, the invention and in particular the second embodiment focuses on the proxy implementation for WLAN to GPRS interworking. However, the invention is not limited thereon. The same principle could be used between other access technologies, or even inside the same access technology, when IP mobility signaling between different administrative domains is required without revealing any confidential addressing, and without requiring access specific procedures, from the target access network to the current access network.

The details given in the description of the first and the second embodiment and the modifications thereof indicate that all the required options are "piggybacked" (i.e., carried) on already existing signaling messages (namely Fast Handover messages). The information contained in these options could be equally transmitted through other mechanisms such as the Internet Control Message Protocol (ICMP) options, for example.

The details of the internal functions of the proxy, as described in the first and second embodiment and the modifications thereof were specific to GPRS. This does not limit the applicability of this invention to other applications such as a WLAN to GPRS handover. If the target network is WLAN, for example, the proxy may maintain a table which maps the relevant WLAN AP MAC addresses to the corresponding AR IP address.

The mobile node (MN) described as an example for a mobile entity mentioned in the above discussed embodiments is only provided as an example of a general network element. That is, the invention is applicable to any entity which can perform a handover or change of connection between two network access entities.

In particular, in this application the term "mobile entity" is used to refer to any entity which switches its IP connectivity from one network access entity to another network access entity. This changeover may be caused by, but not limited to, for example, mobility of the mobile entity, selection by the end user of the mobile entity, or a trigger coming from the network end.

In detail, according to the invention a mechanism is introduced enabling a Mobile Node (MN) as an example for a mobile entity to engage in signaling (e.g., IP signaling) with its off-link previous Access Router (PAR) as an example for the first network access entity, when the publicly routable global unicast IP address of the PAR is not known by the MN. The Mobile Node functionality may be in any mobile station, lap-top computer, PDA equipment or the like.

The delivery of the Fast Binding Update (F-BU) message from MN to PAR in the Fast Handover protocol, when the PAR is a GGSN, is an example when such a mechanism is required. The solution according to this invention applies in the scenarios when the MN has to send the F-BU to the PAR after moving to the target network.

Hence, by using the mechanism proposed by this invention the MN will be able to use the Fast Handover procedure when it performs IP handovers from GPRS to any other target network.

Moreover, the publicly routable global unicast IP address of the GGSN in the GPRS network does not need to be revealed to the MN.

The second network access entity may identify whether the message received from the mobile entity is directed to the first network access entity by checking the address indicated in the message, and check whether the address is globally routable.

On checking the address, it may be judged whether the address is globally routable or not based on a prefix of the address.

The message may be a Fast Binding Update (F-BU) message.

The message including information for identifying the first network access entity may be sent before de-establishing the connection between the mobile entity and the first network entity. Alternatively, the message including information for identifying the first network access entity may be sent after de-establishing the connection between the mobile entity and the first network entity.

When the message including information for identifying the first network access entity is sent before de-establishing the connection between the mobile entity and the first network entity, the second network access entity may receive a message from the first network access entity including the global address of the first network access entity.

The second network access entity may hold a mapping table in which the information for identifying the first network access entity received from the mobile entity is mapped to a global address of the first network access entity.

The information for identifying the first network access entity may include a link layer address of the mobile entity.

Furthermore, a message including all or part of the information for identifying the first network access entity may be sent from the second network access entity to a proxy, wherein the proxy determines the address of the first network access entity.

The information for identifying the first network access entity may include at least one of the following parameters:
old network identity (such as, e.g., PLMN ID, Public Land Mobile Network Identity),
old access point name (e.g., GPRS Access Point Name (APN) if the first network access entity was a GGSN),
identity associated with the access point through which the mobile entity was connected to the first network access entity, and/or
a link layer address of the mobile entity.

Hence, the globally routable address of the first network entity is determined by a proxy, so that the global address does not have to be revealed to the second network entity or the mobile entity.

Thus, according to the invention a handover or another kind of change of connection of a mobile entity between two network access entities can be performed even in case the address of one of the participating network access entities is either not known or is not desired to be publicly known.

The proxy may be also used to forward signalling (and other traffic) between the second network access entity and the first network access entity.

The mobile entity may monitor attributes of the network of the first network access entity, in advance of the handover, in order to obtain information for identifying the first network access entity.

The second network access entity may determine the address of the appropriate proxy based on information included in the information for identifying the first network access entity received from the mobile entity.

Additionally, the above object, for the second scenario, is solved by a method for performing a handing over a connection of a mobile entity from a first network access entity to a second network access entity, wherein a global address of the second network access entity is not known to the mobile entity, the method comprising the step of sending a message including information for identifying the second network access entity from the mobile entity to the first network access entity, which enables the first network entity to direct traffic to the second network entity.

In addition, the above object is solved by a network system including a mobile entity, a first network access entity and a second network access entity, wherein a global address of the second network access entity is not known to the mobile entity. The mobile entity is adapted to send a message including information for identifying the second network access entity to the first network access entity, which enables the first network entity to direct traffic to the second network entity.

Furthermore, a message including all or part of the information for identifying the second network access entity may be sent to a proxy, wherein the proxy determines the address of the second network access entity.

Hence, the globally routable address of the second network entity is determined by a proxy, so that the global address does not have to be revealed to the first network entity or the mobile entity.

Thus, according to the invention a handover or another kind of change of connection of a mobile entity between two network access entities can be performed even in case the address of one of the participating network access entities is either not known or is not desired to be publicly known.

The proxy may also be used to forward signalling (and other traffic) between the first network access entity and the second network access entity.

The mobile entity may monitor attributes of the network of the second network access entity in order to obtain information for identifying the second network access entity.

The first network access entity may determine the address of the proxy based on information included in the information for identifying the second network access entity received from the mobile entity.

The first network access entity may identify whether the message received from the mobile entity is directed to the second network access entity by checking the address indicated in the message, and checking whether the address is globally routable.

Furthermore, during checking the address, it may be judged whether the address is globally routable or not based on a prefix of the address.

The message may be a Handover Initiate (HI) message.

The first network access entity may hold a mapping table in which the information for identifying the second network access entity received from the mobile entity is mapped to a global address of the second network access entity.

The information for identifying the second network access entity may comprise at least one of the following parameters:
 target network identity (such as, e.g., PLMN ID, Public Land Mobile Network Identity),
 target access point name (e.g., target GPRS Access Point Name (APN), if the new connection is a GPRS connection), and/or
 identity associated with the access point through which the mobile entity will be connected to the second network access entity.

The invention claimed is:

1. A method, comprising:
 sending, from a mobile entity to a second network access entity, a message comprising a fast binding update message, the message including information for identifying a first network access entity comprising a gateway general packet radio service support node, wherein the information identifying the first network access entity enables the second network access entity to determine a global address for the first network access entity, wherein the global address of the first network access entity is not known to the mobile entity due to a move by the mobile entity from a previous network to a target network of the second network access entity, wherein the information comprises a link local address associated with the first network access entity, a network identity associated with the previous network of the first network access entity, an access point name associated with an access point through which the mobile entity was connected to the first network access entity, and a link layer address of the mobile entity; and
 handing over a connection of the mobile entity from the first network access entity to the second network access entity,
 wherein the message is configured to enable the second network access entity to direct traffic to the first network access entity based on the information included in the message, wherein the information is mapped, at the second network access entity, to the global address of the first network access entity.

2. The method according to claim 1, further comprising:
 identifying, in the second network access entity, whether the message received from the mobile entity is directed to the first network access entity by checking an address indicated in the message, and checking whether the address is globally routable.

3. The method according to claim 2, wherein the identifying comprises checking the address to determine whether the address is globally routable or not based on a prefix of the address.

4. The method according to claim 1, wherein the sending comprises sending the message before de-establishing a connection between the mobile entity and the first network access entity.

5. The method according to claim 1, wherein the sending comprises sending the message after de-establishing the connection between the mobile entity and the first network access entity.

6. The method according to claim 1, further comprising:
 receiving at the second network access entity a message from the first network access entity including the global address of the first network access entity.

7. The method according to claim 1, further comprising:
 providing in the second network access entity a mapping table in which the information for identifying the first network access entity received from the mobile entity is mapped to a global address of the first network access entity.

8. The method according to claim 1, further comprising:
 sending a message including all or part of the information for identifying the first network access entity to a proxy; and
 determining, using the proxy, an address of the first network access entity.

9. The method according to claim 8, further comprising:
 forwarding, using the proxy, traffic between the second network access entity and the first network access entity.

10. The method according to claim 1, further comprising:
 monitoring, using the mobile entity, attributes of a network of the first network access entity in order to obtain the information for identifying the first network access entity.

11. The method according to claim 8, further comprising:
 determining, using the second network access entity, an address of the proxy based on the information for identifying the first network access entity received from the mobile entity.

12. A method, comprising:
 forming a message for handing over a connection of a mobile entity from a first network access entity to a second network access entity, wherein the message comprises a fast binding update message including information for identifying the first network access entity comprising a gateway general packet radio service support node, wherein the information identifying the first network access entity enables the second network access entity to determine a global address for the first network access entity, wherein the global address of the first network access entity is not known to the mobile entity due to a move by the mobile entity from a previous network to a target network of the second network access entity, wherein the information comprises a link local address associated with the first network access entity, a network identity associated with the previous network of the first network access entity, an access point name associated with an access point through which the mobile entity was connected to the first network access entity, and a link layer address of the mobile entity; and
 sending, from the mobile entity to the second network access entity, the message including the information, wherein the message enables the first network access entity to direct traffic to the second network access entity.

13. The method according to claim 12, further comprising:
sending, a message including all or part of the information for identifying the second network access entity to a proxy; and
determining, using the proxy, an address of the second network access entity.

14. The method according to claim 13, further comprising:
forwarding, using the proxy, traffic between the first network access entity and the second network access entity.

15. The method according to claim 12, further comprising:
monitoring, using the mobile entity, attributes of a network of the second network access entity in order to obtain the information for identifying the second network access entity.

16. The method according to claim 13, further comprising:
determining, using the first network access entity, the address of the proxy based on the information for identifying the second network access entity received from the mobile entity.

17. The method according to claim 12, further comprising:
identifying, in the first network access entity, whether the message received from the mobile entity is directed to the second network access entity by checking an address indicated in the message, and checking whether the address is globally routable.

18. The method according to claim 17, wherein the identifying comprises checking the address to determine whether the address is globally routable or not based on a prefix of the address.

19. The method according to claim 12, wherein the sending comprises sending the message comprising a handover initiate message.

20. The method according to claim 12, wherein
providing in the first network access entity a mapping table in which the information for identifying the second network access entity received from the mobile entity is mapped to a global address of the second network access entity.

21. The method according to claim 12, wherein the sending comprises sending the information for identifying the second network access entity comprising at least one parameter selected from at least one parameter as follows:
a target network identity,
a target access point name, and
an identity associated with an access point through which the mobile entity connects to the second network access entity.

22. An apparatus, comprising:
a processor, wherein the processor is configured to process data related to sending, from a mobile entity to a second network access entity, a message comprising a fast binding update message, the message including information for identifying a first network access entity comprising a gateway general packet radio service support node, wherein the information identifying the first network access entity enables the second network access entity to determine a global address for the first network access entity, wherein the global address of the first network access entity is not known to the mobile entity due to a move by the mobile entity from a previous network to a target network of the second network access entity, wherein the information comprises a link local address associated with the first network access entity, a network identity associated with the previous network of the first network access entity, an access point name associated with an access point through which the mobile entity was connected to the first network access entity, and a link layer address of the mobile entity.

23. The apparatus according to claim 22, wherein the message is a fast binding update message.

24. The apparatus according to claim 22, wherein the information to identify the first network access entity comprises at least one of the following parameters:
old network identity associated with the first network access entity,
old access point name,
identity associated with the access point through which the apparatus was connected to the first network access entity, and/or
a link layer address of the apparatus.

25. The apparatus according to claim 22, wherein the processor is further configured to monitor attributes of the network of the second network access entity in order to obtain information to identify the second network access entity.

26. An apparatus, comprising:
a processor configured to process data related a message comprising a fast binding update message, the message including information for identifying a first network access entity comprising a gateway general packet radio service support node, wherein the information identifying the first network access entity enables the second network access entity to determine a global address for the first network access entity, wherein the global address of the first network access entity is not known to the mobile entity due to a move by the mobile entity from a previous network to a target network of the second network access entity, wherein the information comprises a link local address associated with the first network access entity, a network identity associated with the previous network of the first network access entity, an access point name associated with an access point through which the mobile entity was connected to the first network access entity, and a link layer address of the mobile entity.

27. The apparatus according to claim 26, wherein the processor is configured to monitor attributes of the network of the second network access entity in order to obtain information to identify the second network access entity.

28. The apparatus according to claim 26, wherein the message is a handover initiate message.

29. The apparatus according to claim 26, wherein the information to identify the second network access entity comprises at least one of the following parameters:
a target network identity,
target access point name, or
identity associated with the access point through which the apparatus will be connected to the second network access entity.

30. A computer program product embodied on a non-transitory computer readable medium, the computer program product being configured to control a processor to perform a method comprising:
forming a message which enables a first network entity to direct traffic destined to a second network entity when a connection is handed over from the first network access entity to the second network access entity, wherein the message comprises a fast binding update message including information for identifying the first network access entity comprising a gateway general packet radio service support node, wherein the information identifying the first network access entity enables the second network access entity to determine a global address for the first network access entity, wherein the global address of the first network access entity is not known to the mobile entity due to a move by the mobile entity from a previous network to a target network of the second network access entity, wherein the information comprises a link local address associated with the first network access entity, a network identity associated with the previous network of the first network access entity, an access point name associated with an access point through which the mobile entity was connected to the first network access entity, and a link layer address of the mobile entity; and sending, from the mobile entity to the second network access entity, the message including the information.

31. An apparatus, comprising:

a processor, wherein the processor is configured to:

process a received message from a mobile entity, the message comprising a fast binding update message including information for identifying the first network access entity comprising a gateway general packet radio service support node, wherein the information identifying the first network access entity enables the second network access entity to determine a global address for the first network access entity, wherein the global address of the first network access entity is not known to the mobile entity due to a move by the mobile entity from a previous network to a target network of the second network access entity, wherein the information comprises a link local address associated with the first network access entity, a network identity associated with the previous network of the first network access entity, an access point name associated with an access point through which the mobile entity was connected to the first network access entity, and a link layer address of the mobile entity; and use said message to direct traffic to the second network access entity.

* * * * *